Figure 1:
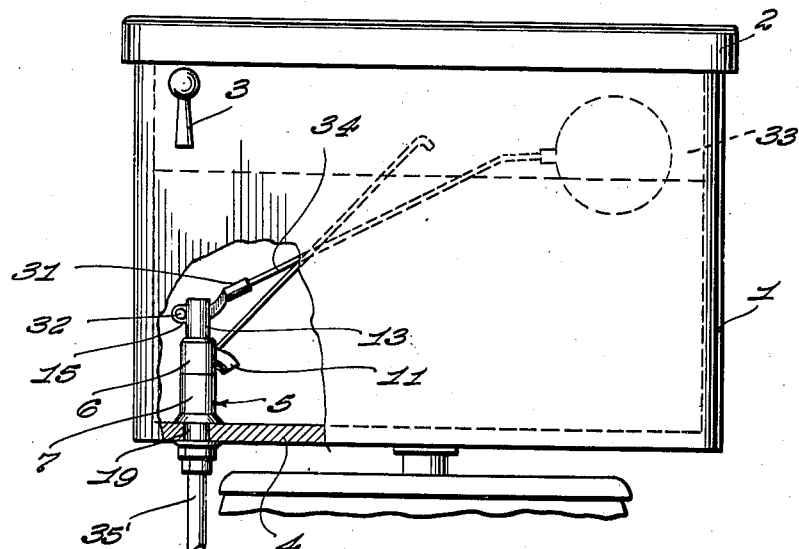

Aug. 10, 1943.　　　　S. L. MARTIN　　　　2,326,544
FLOAT VALVE
Filed Jan. 15, 1941

Inventor
Steve L. Martin
By Lacey & Lacey
Attorneys

Patented Aug. 10, 1943

2,326,544

UNITED STATES PATENT OFFICE 2,326,544

FLOAT VALVE

Steve L. Martin, Menard, Tex.

Application January 15, 1941, Serial No. 374,553

1 Claim. (Cl. 137—104)

This invention relates to valves, and more particularly to an improved float valve for use in conjunction with commodes, and in other applications.

One object of the invention is to provide a float valve which is of such construction that it will be instantly operative, upon lowering or raising of a float, for turning on or shutting off instantaneously the supply of water to a commode tank.

Another object of the invention is to provide a valve of this character having a valve plunger formed with a relatively large slot in which is loosely mounted the operating lever, said loose mounting assuring instantaneous movement of the valve to open or closed position.

A further object of the invention is to provide a float valve which will be noiseless in operation.

A still further object of the invention is to provide a device of this character which is characterized by the utmost simplicity and which will be highly efficient in use.

Other objects of the invention, not mentioned hereinbefore, will become apparent during the course of the following description.

Figure 2:
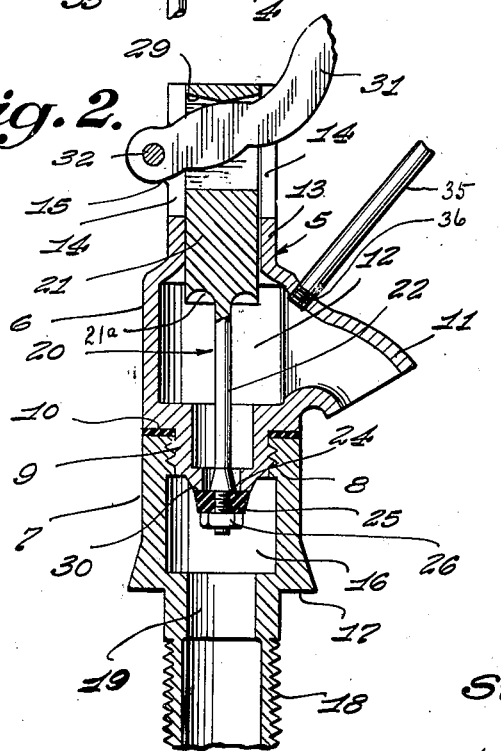
Figure 3:
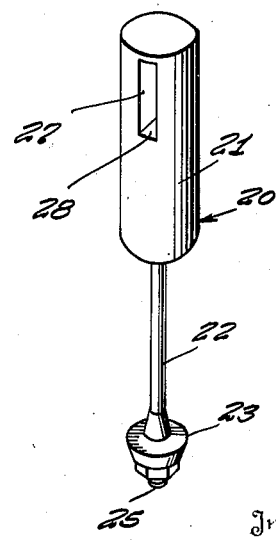

In the drawing forming a part of my application:

Figure 1 is a plan view, partly in section, showing my improved float valve as it would appear installed in a commode tank, Figure 2 is an enlarged vertical sectional view of the float valve, and Figure 3 is an enlarged detail perspective view of the valve element employed, and showing particularly the enlarged slot in the plunger of said valve element.

Referring now more particularly to the accompanying drawing wherein like numerals of reference will be seen to designate like parts throughout the several views, the numeral 1 indicates in general the commode tank which is of conventional construction. The tank 1 is provided with a cover 2 and an operating lever 3. The bottom wall of the tank is shown at 4.

My improved float valve includes a body, which is shown generally at 5, said body including an upper section 6 and a lower section 7, said lower section 7 having a threaded portion 8 which receives an externally threaded nipple 9 on the section 6 for retaining the sections in proper cooperative relation. A gasket 10 is normally disposed between the sections for insuring against leakage. Formed on the upper section 6 is a downwardly directed integral discharge nozzle 11, said nozzle communicating with an upper valve chamber 12 which is formed midway of said section 6.

The section 6 of the body 5 is constricted to define a tubular neck 13, and said neck is formed with horizontally alined slots 14. Formed on the neck adjacent one of the slots are horizontally alined mounting lugs 15.

The lower section 7 of the body 5 is formed with a lower valve chamber 16, and said body is reduced to define a mounting shoulder 17 and an externally threaded coupling nipple 18. A passage 19 communicates between the interior of the coupling nipple and the lower valve chamber 16. Operatively mounted in the body 6 is a valve element 20, said valve element including an integral plunger 21, and a stem 22 and a valve disc 23. More specifically, by referring to Figure 2 of the drawing, it will be seen that the plunger 21 is formed with a concave annular lower surface 21ª which serves to deflect water flowing upwardly through the body downwardly into the chamber 12. Water will thus be prevented from escaping along the neck 13. The lower end of the stem is enlarged to define a shoulder 24 and a threaded portion 25, said threaded portion receiving the disc 23, and said disc being held in place by a nut 26 which is screwed on said threaded portion 25. Formed in the upper end of the plunger 21 of the element 20 is a vertically disposed elongated slot 27, said slot having a flat bottom wall 28 and a substantially V-shaped top wall 29 forming inclined bearing surfaces.

As clearly seen in Figure 2, the element 20 is mounted within the sections 6 and 7 of the body with the plunger slidably disposed within the neck 13 and with the slot 27 in alinement with the slots 14. The stem 22 extends downwardly through the upper valve chamber 12, through the nipple 9 and into the lower chamber 16, the valve disc 23 being carried within said chamber and cooperating with the lower end of said nipple 9 to define a valve seat, which, for convenience, will be designated at 30.

In order to shift the valve element 20, for opening and closing the valve, I provide an operating lever 31 which extends through the slots 14 and the slot 27 and has one end pivotally mounted in the lugs 15 by means of a pin 32. The lever 31 has its other end operatively connected with a float 33 by means of a float arm 34. It is particularly desired to emphasize that the lever 31 is loosely mounted within the slot 27. The purpose for this particular type of mounting will be set forth hereinafter.

As best seen in Figures 1 and 2 of the drawing, a refilling tube is employed. This refilling tube is indicated at 35 and is formed with a threaded lower end 36, said threaded lower end being screwed into the nozzle 11 near the junction of the upper surface thereof with the neck 13.

The operation of my improved float valve will now be briefly set forth. After the device has been mounted in the tank 1, as shown in Figure 1, and the float 33 has been connected with the lever 31 by means of the arm 34 and the nipple 18 has been connected with a supply pipe, such as the pipe 35', the valve is ready for use. When the tank is empty, the float will, of course, rest on the bottom wall 4 of said tank. In this position, the lever 31 will be in lowered position and the plunger 21 of the element 20 will be in its lowermost position within the neck 13 of the body 5. In this position, the valve disc 23 will be out of engagement with the valve seat 30 with the result that water may pass upwardly through the chambers 16 and 12 and through the nozzle 11 into the tank. When the water reaches the level shown in dotted lines in Figure 1, the float will have shifted the arm 34 and the lever 31 to its uppermost position. In this position, the plunger 21 will also be in its uppermost position and the valve disc 23 will be in tight closing engagement with the seat 30, with the result that the supply of water to the tank will be shut off.

When the tank is emptied by flushing, the float will, of course, again return to the bottom of said tank. It is particularly desired to emphasize that, inasmuch as the lever 31 is mounted loosely in the slot 27, free movement of the plunger 21, either to open or closed position, will be permitted. Thus, when the float moves to the bottom of the tank, the plunger 21 will instantaneously drop for shifting the disc 23 out of engagement with the seat 30 for opening the valve and admitting water to the tank. In other words, due to the fact that the lever 31 is loosely mounted within the slot 27 of the plunger 21, danger of sticking will be prevented. Moreover, a further advantage for the loose mounting of the lever 31 within the slot 27 is that water pressure will be allowed to assist in effecting closing of the valve and consequently shutting off water to the tank.

Attention is directed to the fact that, inasmuch as the valve element 20 is loosely mounted within the body 5, said valve will be permitted to operate noiselessly.

It has been found that, in view of the fact that the loose mounting of the valve plunger permits the float to open the valve instantly on a downward stroke of the plunger and water to close said valve instantly on the upward stroke thereof, undue wear on the valve disc 23 will be avoided.

It is believed that the construction and operation of my improved float valve will now be thoroughly understood.

Having thus described the invention, what is claimed as new is:

A float valve comprising a body having upper and lower sections, the upper section being hollow to provide an upper valve chamber and having its upper portion constricted to form a neck extending upwardly from the valve chamber, a spout extending laterally from said chamber, an externally threaded nipple extending downwardly from the valve chamber and formed with a valve seat at its lower end, the lower section being hollow to form a lower valve chamber formed with a lower inlet and having its upper end screwed upon the threaded nipple of the upper section, a solid plunger slidable longitudinally in said neck and having its upper portion formed with a transverse slot registering with opposed slots in the neck and its lower portion cut away to form a reduced stem extending downwardly through the upper chamber and nipple and into the lower chamber, the slot of the plunger having a flat lower wall and a substantially V-shaped upper wall, a float lever pivoted at one end to the neck and passing through the registering slots of the neck and the plunger and formed with arcuate upper and lower edges for engaging the upper and lower walls of the slot in the plunger and shifting the plunger longitudinally through the neck, the lower end face of the plunger at its junction with the stem being concave to form an annular recess entirely surrounding the upper end of the stem and disposed within and spaced from the side walls of the upper chamber, a valve disc fitting about the lower end portion of the stem within the lower chamber, and a nut threaded upon the lower end of the stem and engaging the valve disc to removably hold the disc in place in position for seating against the valve seat when the plunger and the stem are shifted upwardly by the float lever.

STEVE L. MARTIN.